(12) United States Patent
Omori

(10) Patent No.: US 9,311,963 B2
(45) Date of Patent: Apr. 12, 2016

(54) RECORDING APPARATUS AND CONTROL METHOD THEREOF

(71) Applicant: CANON KABUSHIKI KAISHA, Tokyo (JP)

(72) Inventor: Noboru Omori, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 79 days.

(21) Appl. No.: 14/180,673

(22) Filed: Feb. 14, 2014

(65) Prior Publication Data

US 2014/0233908 A1 Aug. 21, 2014

(30) Foreign Application Priority Data

Feb. 21, 2013 (JP) ................................ 2013-032442

(51) Int. Cl.
| | |
|---|---|
| *H04N 5/77* | (2006.01) |
| *H04N 5/262* | (2006.01) |
| *H04N 9/80* | (2006.01) |
| *G11B 27/10* | (2006.01) |
| *H04N 9/82* | (2006.01) |
| *G11B 27/11* | (2006.01) |
| *H04N 5/907* | (2006.01) |

(52) U.S. Cl.
CPC .............. *G11B 27/105* (2013.01); *G11B 27/11* (2013.01); *H04N 5/772* (2013.01); *H04N 9/8227* (2013.01); *H04N 5/907* (2013.01)

(58) Field of Classification Search
CPC ...... G11B 27/105; G11B 27/11; H04N 5/772; H04N 5/907; H04N 9/8227
USPC ........ 386/228, 241, E5.072; 348/239, E5.051
See application file for complete search history.

(56) References Cited

U.S. PATENT DOCUMENTS 6,978,086 B2 * 12/2005 Nakayama ........... H04N 1/2112
348/E5.051

FOREIGN PATENT DOCUMENTS

JP 05-048943 A 2/1993

* cited by examiner

*Primary Examiner* — Geepy Pe
*Assistant Examiner* — Syed Hasan
(74) *Attorney, Agent, or Firm* — Cowan, Liebowitz & Latman, P.C.

(57) ABSTRACT

An apparatus, comprises an obtaining unit which obtains moving image data; a recording unit which records the obtained moving image data on first and second media; and a control unit which controls the recording unit to, in accordance with an instruction to start recording on the second medium during recording of the moving image data on the first medium, start recording of the moving image data on the second medium, and in accordance with an instruction to stop recording on the second medium during recording of the moving image data on the first medium, stop recording of the moving image data on the second medium and record, on the first medium, additional information about positions in the moving image data recorded on the first medium that correspond to the start and stop instructions.

15 Claims, 7 Drawing Sheets

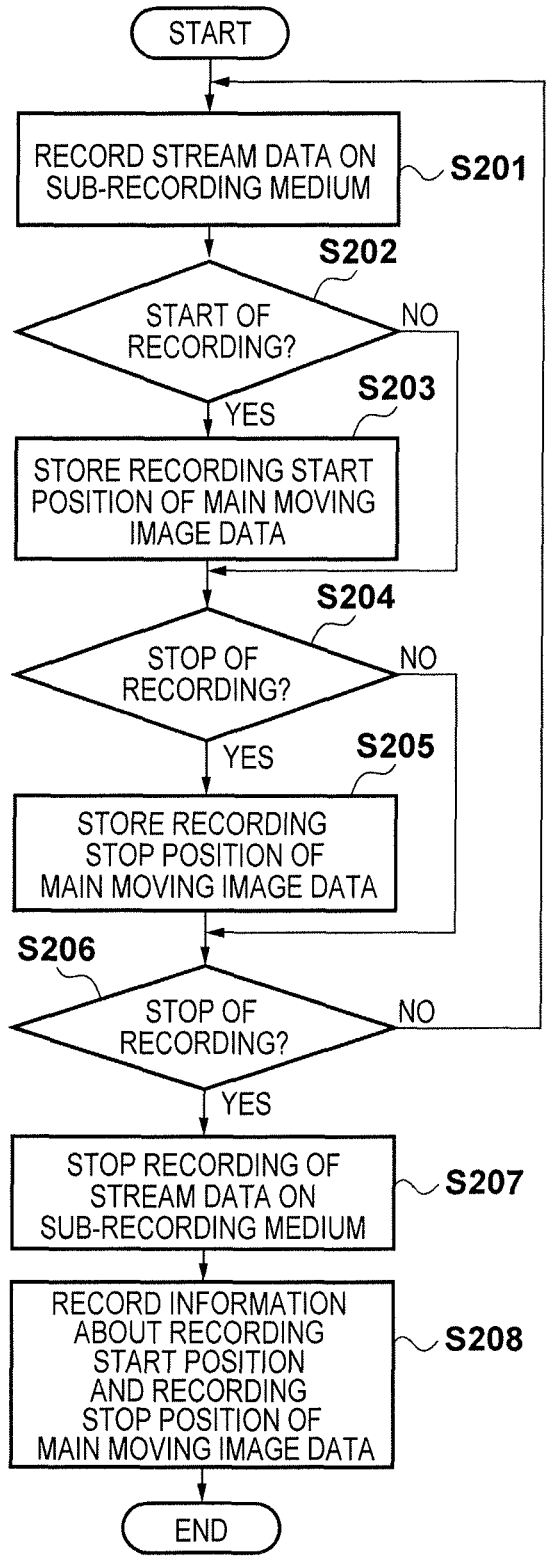
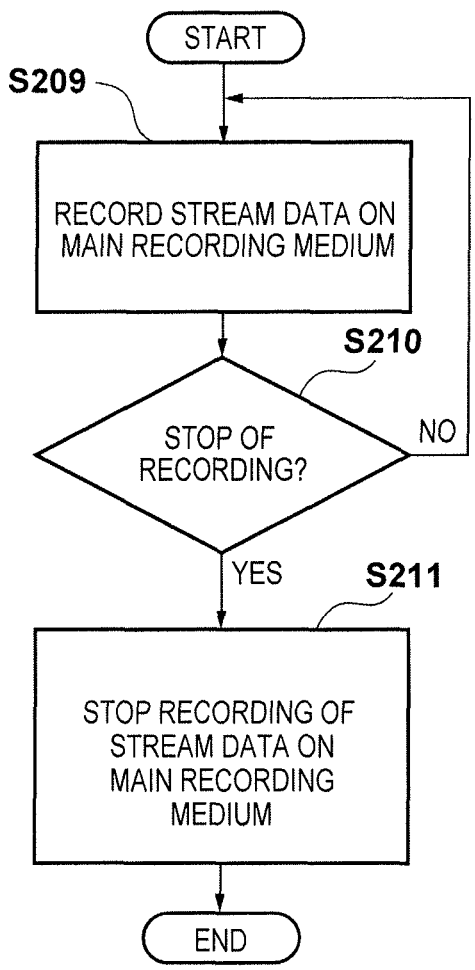

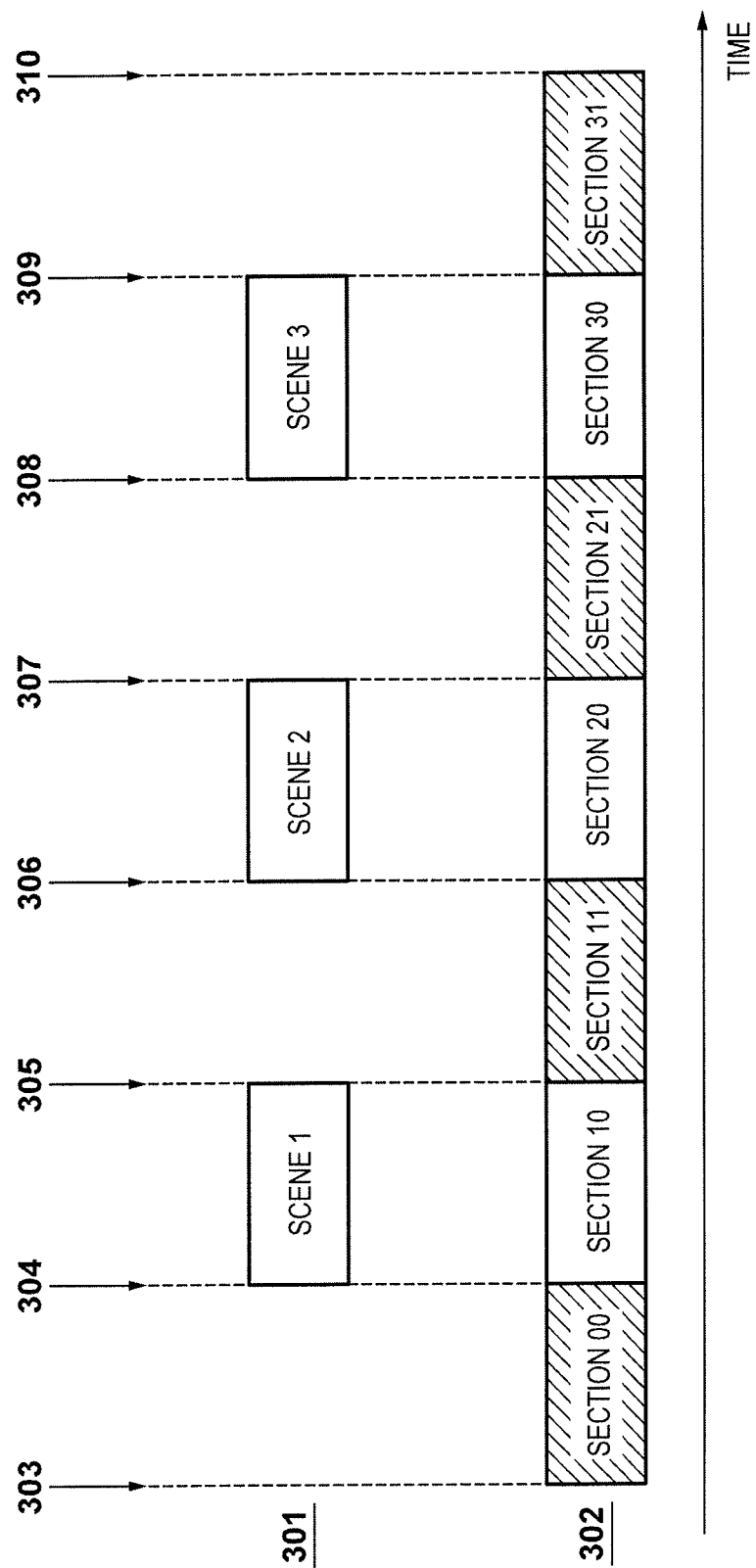

RECORDING APPARATUS AND CONTROL METHOD THEREOF

BACKGROUND OF THE INVENTION

1. Field of the Invention

The present invention relates to a technique of recording data simultaneously on a plurality of recording media.

2. Description of the Related Art

Conventionally, a video camera has been known as an apparatus which records moving images and voices. An apparatus of this type is configured so that the user operates an operation unit called a trigger button to instruct the start and stop of recording (see, for example, Japanese Patent Laid-Open No. 05-048943).

When the start/stop of recording is instructed by operating the single trigger button in the above way, the user may instruct the stop of recording in practice though the user has intended to instruct the start of recording, or may instruct the start of recording in practice though the user has intended to instruct the stop of recording. For this reason, a moving image intended by the user may not be shot, and a scene not intended by him may be recorded.

SUMMARY OF THE INVENTION

The present invention has been made in consideration of the aforementioned problems, and enables recording a scene intended by the user even when the user erroneously instructs the start or stop of recording.

In order to solve the aforementioned problems, the present invention provides a recording apparatus, comprising: an obtaining unit configured to obtain moving image data; a recording unit configured to record the moving image data obtained by the obtaining unit on a first recording medium and a second recording medium; and a control unit configured to control the recording unit to, in accordance with an instruction to start recording on the second recording medium during recording of the moving image data on the first recording medium, start recording of the moving image data on the second recording medium, and in accordance with an instruction to stop recording on the second recording medium during recording of the moving image data on the first recording medium, stop recording of the moving image data on the second recording medium and record, on the first recording medium, additional information about positions in the moving image data recorded on the first recording medium that correspond to the instruction to start recording and the instruction to stop recording on the second recording medium.

In order to solve the aforementioned problems, the present invention provides a control method of a recording apparatus which includes an obtaining unit configured to obtain moving image data, and records the moving image data obtained by the obtaining unit on a first recording medium and a second recording medium, the method comprising: controlling to, in accordance with an instruction to start recording on the second recording medium during recording of the moving image data on the first recording medium, start recording of the moving image data on the second recording medium, and in accordance with an instruction to stop recording on the second recording medium during recording of the moving image data on the first recording medium, stop recording of the moving image data on the second recording medium and record, on the first recording medium, additional information about positions in the moving image data recorded on the first recording medium that correspond to the instruction to start recording and the instruction to stop recording on the second recording medium.

According to the present invention, even when the user erroneously instructs the start or stop of recording, a scene intended by him can be recorded.

Further features of the present invention will become apparent from the following description of exemplary embodiments (with reference to the attached drawings).

BRIEF DESCRIPTION OF THE DRAWINGS

FIGS. 2A and 2B are flowcharts showing recording processing for moving image data according to the embodiment;

FIG. 3 is a view exemplifying moving image data recorded in the backup recording mode;

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments.

An embodiment in which a recording apparatus according to the present invention is applied to an image capturing apparatus such as a digital video camera for recording a moving image will be described with reference to FIGS. 1 to 4E.

<Apparatus Configuration> First, the configuration of an image capturing apparatus 100 will be explained with reference to FIG. 1.

Figure 1:
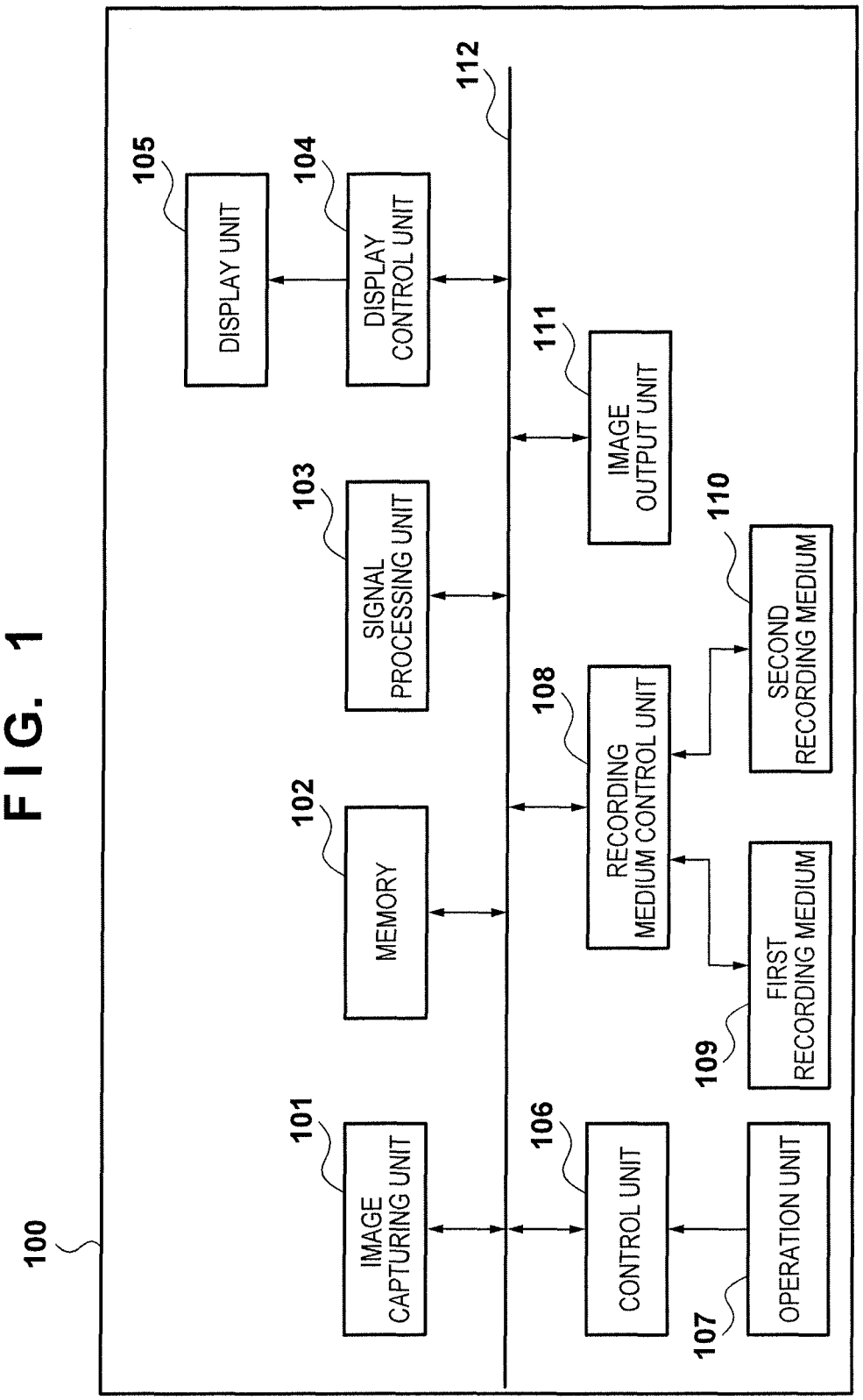
FIG. 1 is a block diagram showing an apparatus configuration according to an embodiment of the present invention.

Referring to FIG. 1, an image capturing unit 101 includes an optical system including a zoom lens, focus lens, stop, and shutter, and an image sensor such as a CCD or CMOS. The image capturing unit 101 photoelectrically converts, by the image sensor, the optical image of an object that is formed via the optical system, thereby generating an analog signal. The image capturing unit 101 converts the generated analog signal into a digital signal, and sends the digital signal to a signal processing unit 103. In the embodiment, the image capturing unit 101 has one screen of 1,920 pixels (lateral)×1,080 pixels (longitudinal) and can output moving image data of 60 frames per second.

A memory 102 stores moving image data and other data. Each block of the image capturing apparatus 100 accesses the memory 102 to perform necessary processing. In addition to moving image data, the memory 102 stores management information such as file system data, and various kinds of information. Further, the memory 102 functions as, for example, a work memory for control by a control unit 106. Also, the memory 102 functions as a buffer memory in the recording mode and reproduction mode for moving image data.

In the recording mode, the signal processing unit 103 reads out moving image data which has been obtained by the image capturing unit 101 and temporarily stored in the memory 102, and performs image quality adjustment processing to adjust the white balance, color, brightness, and the like. The signal processing unit 103 compression-encodes the moving image data, having undergone the image quality adjustment processing, by MPEG4, AVC/H.264, or the like, thereby generating a moving image file. A recording medium control unit 108 records the moving image file on a first recording medium 109 and/or a second recording medium 110. The signal processing unit 103 generates representative image data (thumbnail data) from stream data of the moving image file. In the reproduction mode, the signal processing unit 103 decodes the stream data of the moving image file read out by the recording medium control unit 108, and sends it to a display control unit 104. In accordance with an instruction from the control unit 106, the display control unit 104 controls a display unit 105 to display video corresponding to a moving image signal sent from the signal processing unit 103, a menu screen for operating the image capturing apparatus 100, and various kinds of information. The display unit 105 is an arbitrary display device such as a liquid crystal display, organic EL display, or electronic paper.

The control unit 106 controls the operation of the overall apparatus in accordance with an instruction input from an operation unit 107. The control unit 106 includes a microcomputer (CPU) and memory, and controls the image capturing apparatus 100 in accordance with a program stored in a memory (not shown). The control unit 106 incorporates an interface for transmitting/receiving data and control instructions between the control unit 106 and the recording medium control unit 108.

The operation unit 107 includes physical buttons and dials operable by the user, and buttons and knobs displayed on the display unit 105 such as a touch panel. The operation unit 107 receives an instruction signal corresponding to an operation by the user, and sends it to the control unit 106. The control unit 106 controls each block by sending a control instruction to each block of the image capturing apparatus 100 via a data bus 112 based on the instruction signal sent from the operation unit 107.

The operation unit 107 includes, for example, switches for instructing power-on/off, the start/stop of recording, mode switching, a menu screen, and the like, a cursor key, and a pointing device for designating an arbitrary point on the display unit 105. The operation unit 107 also includes switches for instructing the start/stop of recording in the backup recording mode (to be described later), switching of an index screen, and the like. In the embodiment, the switch for instructing the start/stop of recording is a trigger button, and outputs a recording start or stop instruction in every operation. The start/stop of recording in the backup recording mode may be instructed by an enable/disable button on the menu screen, or by a physical button having a function of instructing the start/stop of recording on a backup recording medium.

In the reproduction mode, the recording medium control unit 108 reads out moving image data, various data, programs, and the like recorded on at least either of the first recording medium 109 and second recording medium 110, and sends the readout moving image data to the signal processing unit 103. The signal processing unit 103 decodes the moving image data obtained from the recording medium control unit 108 in predetermined procedures, and sends the decoded moving image signal to the display control unit 104. In recording, the recording medium control unit 108 records, on the first recording medium 109 and second recording medium 110, moving image data, thumbnail data, and other data generated by the signal processing unit 103.

The first recording medium 109 and second recording medium 110 are separate recording media independent of each other, and are arbitrarily readable/writable recording media such as a flash memory. In the embodiment, the first recording medium 109 and second recording medium 110 are memory cards each of which incorporates an arbitrarily data readable/writable flash memory.

The recording medium control unit 108 manages, as a file in accordance with a file system such as FAT (File Allocation Table), moving image data and various kinds of information to be recorded on the first recording medium 109 and second recording medium 110. The recording medium control unit 108 includes a known interface (I/F) such as ATA (AT Attachment), and transmits/receives data and various control instructions to/from the control unit 106. The first recording medium 109 and second recording medium 110 are configured to be easily detachable from the slot (not shown) of the image capturing apparatus 100 by a detachable mechanism (not shown). However, either of the first recording medium 109 and second recording medium 110 may be incorporated in the apparatus.

The recording medium control unit 108 detects whether the first recording medium 109 or second recording medium 110 has been mounted, and sends the detection result to the control unit 106. The recording medium control unit 108 detects the remaining capacities of the first recording medium 109 and second recording medium 110, and sends them to the control unit 106.

An image output unit 111 is formed from, for example, a video output terminal, and sends an image signal to display video on an external display or the like connected to the image capturing apparatus 100. The image output unit 111 may be one integrated terminal such as HDMI®.

The data bus 112 functions as a transmission path for sending various data, control instructions, and the like to each block of the image capturing apparatus 100.

When the recording medium control unit 108 writes/reads out a moving image file on/from the first recording medium 109 or second recording medium 110, the control unit 106 reads out file system data from the first recording medium 109 and second recording medium 110, and stores them in the memory 102. The file system data are data representing the file names and sizes of data recorded on the first recording medium 109 and second recording medium 110, the recording addresses of the data, and the like. The file system data are management information for managing a file. The control unit 106 controls write/readout of moving image data in accordance with the file system data read out from the memory 102. The control unit 106 updates the file system data stored in the memory 102 in response to write of data on the recording medium, and the recording medium control unit 108 records the updated file system data on the recording medium.

<Normal Recording Processing> Next, normal recording processing by the image capturing apparatus according to the embodiment will be explained.

In the embodiment, the number of pixels of one frame of moving image data to be recorded is 1,920 pixels (lateral)× 1,080 pixels (longitudinal). The frame rate (number of frames per unit time) of moving image data to be recorded is 59.94 frames/sec (fps). Note that the number of pixels of moving image data and the frame rate can also take other values.

When the operation unit 107 is turned on, the control unit 106 controls each block, displays moving image data captured by the image capturing unit 101 on the display unit 105, and changes the image capturing apparatus 100 to the recording standby state. If the start of recording is instructed from the operation unit 107 in the recording standby state, the control unit 106 instructs the signal processing unit 103 to start encoding of moving image data. In accordance with the instruction from the control unit 106, the signal processing unit 103 reads out and encodes moving image data which have been captured by the image capturing unit 101 and sequentially stored in the memory 102. The signal processing unit 103 stores the encoded moving image data in the memory 102.

The control unit 106 instructs the recording medium control unit 108 to start recording of moving image data. The control unit 106 generates a time code representing the elapsed time (number of frames) after the start time of recording, and sends it to the recording medium control unit 108. The time code includes information about hours, minutes, seconds, and frames. The recording medium control unit 108 reads out the encoded moving image data from the memory 102, adds various necessary data to it to generate recording stream data, and records the generated stream data on either of the first recording medium 109 and second recording medium 110. In the embodiment, the user operates the operation unit 107 to select either of the first recording medium 109 and second recording medium 110 as a recording destination, and records the recording stream data on the recording medium serving as the recording destination. When only either of the first recording medium 109 and second recording medium 110 is mounted, the control unit 106 instructs the recording medium control unit 108 to record the recording stream data on the mounted recording medium regardless of a recording medium selected by the user as a recording destination.

In accordance with an instruction from the control unit 106, the recording medium control unit 108 records stream data on either of the first recording medium 109 and second recording medium 110. If the stop of recording is instructed from the operation unit 107 after the start of recording, the control unit 106 instructs the recording medium control unit 108 to stop recording, and stops recording of the stream data on the first recording medium 109 and/or second recording medium 110. Also, the control unit 106 instructs the signal processing unit 103 to stop encoding processing. The recording medium control unit 108 manages, as one scene of a moving image, stream data recorded in an interval between the recording start instruction and the recording stop instruction.

<Backup Recording Processing> Next, backup recording processing by the image capturing apparatus according to the embodiment will be explained. In the embodiment, the image capturing apparatus performs backup recording in which, during recording of moving image data on either of the first recording medium 109 and second recording medium, the same moving image data is simultaneously recorded on the other recording medium in accordance with a recording start/stop instruction by the user.

In the embodiment, when both the first recording medium 109 and second recording medium are mounted, the user can operate the operation unit 107 to set the operation mode of the apparatus to the backup recording mode. Also, the user can operate the operation unit 107 to set a main recording medium (second recording medium) and a sub-recording medium (first recording medium) as moving image data recording destinations in the backup recording mode. Until backup recording is stopped or disabled after the backup recording mode is enabled, moving image data is kept recorded on the sub-recording medium regardless of a recording start/stop instruction from the user to the main recording medium. That is, enabling the backup recording mode is synonymous with an instruction to start recording on the sub-recording medium, and disabling the backup recording mode is synonymous with an instruction to stop recording on the sub-recording medium.

In the backup recording mode, recording of moving image data on the main recording medium is performed in accordance with a recording start/stop instruction during recording of moving image data on the sub-recording medium.

In the backup recording mode, the control unit 106 records, together with a backup moving image, information about a position at which the start/stop of recording on the main recording medium has been instructed in the backup moving image. More specifically, when the start/stop of recording on the main recording medium is instructed, information about the number of frames of moving image data from the start of backup recording is recorded.

Recording processing for moving image data in the backup recording mode by the image capturing apparatus according to the embodiment will be explained with reference to FIG. 2. Note that the processing in FIG. 2 is implemented by expanding a program stored in a ROM or the like in the work area of the memory 102 and executing it by the control unit 106.

Moving image data to be recorded on the sub-recording medium will be called backup moving image data, and moving image data to be recorded on the main recording medium will be called main moving image data. Assume that the first recording medium 109 is selected as a main recording medium, and the second recording medium 110 is selected as a sub-recording medium.

When the backup recording mode is enabled, the control unit 106 selects the second recording medium 110 as the sub-recording medium, and displays moving image data captured by the image capturing unit 101 on the display unit 105. In accordance with an instruction from the control unit 106, the signal processing unit 103 generates recording stream data by encoding backup moving image data, and stores it in the memory 102.

FIG. 2A shows recording processing for backup moving image data on the sub-recording medium.

The recording medium control unit 108 reads out stream data from the memory 102, and records it on the sub-recording medium 110 (step S201). After the start of recording backup moving image data in this manner, the control unit 106 determines whether the start of recording main moving image data has been instructed from the operation unit 107 (step S202). If the start of recording main moving image data has been instructed, the control unit 106 stores, in the memory 102, information about a position from the start of the frame for which the start of recording main moving image data has been instructed in the backup moving image data.

Then, the control unit 106 determines whether the stop of recording main moving image data has been instructed from the operation unit 107 (step S204). If the stop of recording main moving image data has been instructed, the control unit 106 stores, in the memory 102, information about a position from the start of the frame for which the stop of recording main moving image data has been instructed in the backup moving image data (step S205). In this manner, when the start/stop of recording main moving image data is instructed during recording of backup moving image data, the memory 102 stores information about a position from the start of the frame for which the start/stop of recording main moving image data has been instructed in the backup moving image data.

Thereafter, the control unit 106 determines whether disabling of the backup recording mode has been instructed from the operation unit 107 (step S206). If disabling of the backup recording mode has been instructed, the control unit 106 stops recording of stream data on the sub-recording medium 110 (step S207).

The control unit 106 instructs the recording medium control unit 108 to read out, from the memory 102, information about the recording start position and recording stop position of the main moving image data recorded in the backup recording mode, and record it as additional information of the backup moving image data. In accordance with the instruction from the control unit 106, the recording medium control unit 108 reads out, from the memory 102, information about the recording start position and recording stop position of the main moving image data, and records it as additional information of the backup moving image data on the sub-recording medium 110 (step S208).

Also, the control unit 106 records, as additional information of the backup moving image data on the sub-recording medium 110, identification information such as the file name of the main moving image data recorded during recording of the backup moving image data.

Thereafter, the control unit 106 stops generation of recording stream data encoded by the signal processing unit 103.

FIG. 2B shows recording processing for main moving image data on the main recording medium 109.

If the start of recording main moving image data has been instructed from the operation unit 107 during of the backup moving image data shown in FIG. 2A, the control unit 106 instructs the recording medium control unit 108 to start recording of moving image data on the main recording medium 109 (step S209).

The signal processing unit 103 according to the embodiment encodes moving image data according to H.264. In H.264, encoding is performed according to one of intra-frame predictive coding, forward inter-frame predictive coding, and bidirectional inter-frame predictive coding. Also in H.264, encoding is performed using, as a unit, a GOP having a predetermined number of frames including frames to be encoded by intra-frame predictive coding. In the backup recording mode, the start of recording main moving image data is instructed during recording of backup moving image data, so a frame corresponding to the recording start instruction does not always come to the start of a GOP. For this reason, when the start of recording main moving image data is instructed, the control unit 106 instructs the recording medium control unit 108 to start recording from a frame at the start of a GOP including a frame corresponding to the recording start instruction.

If the stop of recording main moving image data has been instructed from the operation unit 107 during recording of main moving image data (YES in step S210), the control unit 106 instructs the recording medium control unit 108 to stop recording of stream data on the main recording medium 109 (step S211). In accordance with the instruction from the control unit 106, the recording medium control unit 108 stops recording of stream data on the main recording medium 109.

FIG. 3 exemplifies main moving image data and backup moving image data recorded in the backup recording mode.

In FIG. 3, main moving image data 301 is recorded on the main recording medium 109, and backup moving image data 302 is recorded on the sub-recording medium 110. When the backup recording mode is enabled at time 303 and the start of recording backup moving image data is instructed, recording of the backup moving image data 302 is started. The start of recording main moving image data is instructed at time 304, and the stop of recording the main moving image data is instructed at time 305. As a result, main moving image data of scene 1 is recorded at an interval between the time 304 and the time 305. The memory 102 stores the positions of frames corresponding to the time 304 and time 305 from the first frame of the backup moving image data 302. Similarly, main moving image data of scene 2 and scene 3 are recorded, and the memory 102 stores the positions of frames corresponding to time 306, time 307, time 308, and time 309 from the first frame of the backup moving image data 302.

In FIG. 3, each section in the backup moving image data 302 represents the time sectionalized by the recording start position and recording stop position of main moving image data during recording of backup moving image data. Section 00 is a section from the start of backup recording to the start of recording scene 1. Section 31 is a section from the stop of recording scene 3 to the stop of backup recording.

<Reproduction Processing (Other Than Backup Moving Image Data)> Next, reproduction processing for moving image data by the image capturing apparatus according to the embodiment will be explained.

First, reproduction processing for moving image data other than backup moving image data will be explained.

When a shift to the reproduction mode is instructed from the operation unit 107, the control unit 106 displays the index screen of scenes including the representative images (thumbnail images) of moving image files recorded on a recording medium selected from the first recording medium 109 and second recording medium 110. For example, when the first recording medium 109 is selected, the control unit 106 controls the display unit 105 to display the index screen of moving image files recorded on the first recording medium 109.

In the embodiment, when recording moving image data, thumbnail image data is generated by reducing the first frame of each moving image data, and added and recorded in a moving image file. The recording medium control unit 108 reads out thumbnail image data of each moving image file, and sends it to the signal processing unit 103. The signal processing unit 103 generates an index screen including thumbnail image data of each moving image file, and sends it to the display control unit 104. The display control unit 104 displays the index screen on the display unit 105.

The user can instruct the start of reproduction by selecting, via the operation unit 107, one of representative images displayed on the index screen. The control unit 106 instructs the recording medium control unit 108 to reproduce the moving image of a scene corresponding to the selected representative image. In accordance with the instruction from the control unit 106, the recording medium control unit 108 reads out stream data of the designated moving image file from the first recording medium 109 or second recording medium 110, and sends it to the signal processing unit 103.

The signal processing unit 103 decodes the readout stream data and stores the decoded data in the memory 102. The display control unit 104 converts the screen (picture) size of the moving image data stored in the memory 102 to match the size of the display unit 105, and then displays the moving image data on the display unit 105.

If the stop of reproduction is instructed from the operation unit 107 after reproducing the moving image, the control unit 106 instructs each block to stop reproduction. In accordance with the instruction from the control unit 106, the recording medium control unit 108 stops readout of stream data. The signal processing unit 103 generates an index screen again and sends it to the display control unit 104. The display control unit 104 displays the index screen on the display unit 105 instead of the moving image reproduction screen.

<Reproduction Processing for Backup Moving Image Data> Next, reproduction processing for backup moving image data by the image capturing apparatus according to the embodiment will be explained.

When a shift to the reproduction mode of backup moving image data is instructed from the operation unit 107, the control unit 106 determines whether backup moving image data has been recorded on a recording medium selected from the first recording medium 109 and second recording medium 110. If backup moving image data has been recorded, the control unit 106 controls the display control unit 104 to display identification information such as the file name of the backup moving image data on the display unit 105. When a plurality of backup moving image data have been recorded, the user can select one of the plurality of displayed backup moving image data via the operation unit 107.

The control unit 106 instructs the recording medium control unit 108 to read out thumbnail image data of the backup moving image data selected by the user, and information about the recording start position and recording stop position of main moving image data recorded during recording of the backup moving image data. In accordance with the instruction from the control unit 106, the recording medium control unit 108 reads out, from the backup moving image file, the thumbnail image data and the information about the recording start position and recording stop position of main moving image data, and stores them in the memory 102. The signal processing unit 103 reads out the thumbnail image data from the memory 102, generates an index screen including the thumbnail image data of the backup moving image data, and sends it to the display control unit 104. The display control unit 104 displays the index screen of the backup moving image data on the display unit 105.

Figure 4A:
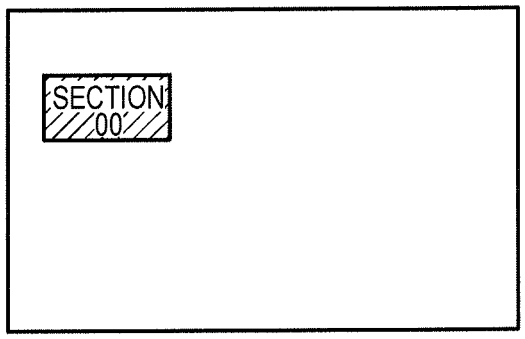
FIGS. 4A to 4E are views each exemplifying the index screen of moving image data.

FIG. 4A exemplifies the index screen of backup moving image data. The index screen in FIG. 4A will be called the first index screen. In the first index screen, thumbnail image data of backup moving image data is displayed. For example, the first frame of first section 00 is displayed as the thumbnail image of the backup moving image data 302 in FIG. 3.

The user can operate the operation unit 107 to switch the index screen to the index screen of the recording start positions of main moving image data, the index screen of recording stop positions, or the index screen of all sections.

For example, when displaying the index screen of the recording start positions of main moving image data, the control unit 106 instructs the recording medium control unit 108 to read out data corresponding to the respective recording start positions based on information about the recording start positions of main moving image data stored in the memory 102. The recording medium control unit 108 reads out moving image data of the designated portions, and sequentially sends them to the signal processing unit 103. The control unit 106 instructs the signal processing unit 103 to reduce frames corresponding to the recording start positions of the main moving image data and generate thumbnail image data. The signal processing unit 103 decodes the readout moving image data, and reduces the frames designated by the control unit 106, generating thumbnail image data. The signal processing unit 103 generates an index screen including the thumbnail image data of screens (pictures) associated with the respective recording start positions, and sends it to the display control unit 104. The display control unit 104 displays the generated index screen on the display unit 105.

Figure 4B:
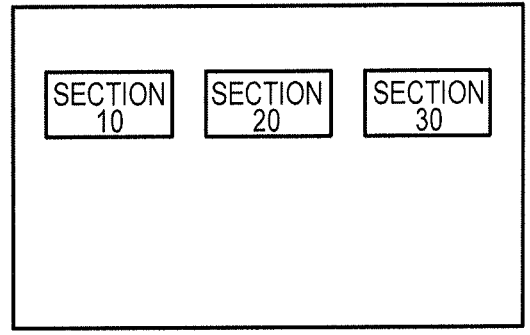

FIG. 4B exemplifies the index screen of the recording start positions of main moving image data. The index screen in FIG. 4B will be called the second index screen. The second index screen displays the thumbnail images of frames corresponding to the recording start positions of main moving image data recorded during recording of backup moving image data. For example, when the backup moving image data 302 and main moving image data 301 are recorded as shown in FIG. 3, the first frames of first section 10, section 20, and section 30 are displayed.

When displaying the index screen of the recording stop positions of main moving image data, the control unit 106 instructs the recording medium control unit 108 to read out data corresponding to the respective recording stop positions based on information about the recording stop positions of main moving image data stored in the memory 102.

The recording medium control unit 108 reads out moving image data of the designated portions, and sequentially sends them to the signal processing unit 103. The control unit 106 instructs the signal processing unit 103 to reduce frames corresponding to the recording stop positions of the main moving image data and generate thumbnail image data. The signal processing unit 103 decodes the readout moving image data, and reduces the frames designated by the control unit 106, generating thumbnail image data. The signal processing unit 103 generates an index screen including the thumbnail images of pictures (screens) associated with the respective recording stop positions, and sends it to the display control unit 104. The display control unit 104 displays the generated index screen on the display unit 105.

Figure 4C:
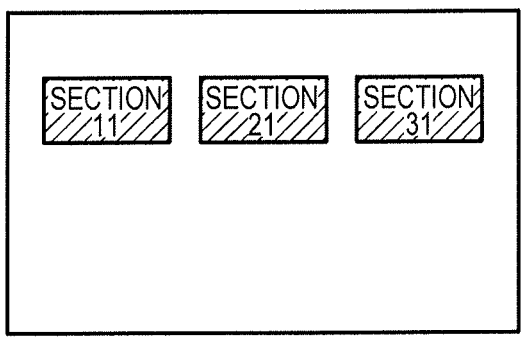

FIG. 4C exemplifies the index screen of the recording stop positions of main moving image data. The index screen in FIG. 4C will be called the third index screen. The third index screen displays the thumbnail images of frames corresponding to the recording stop positions of main moving image data recorded during recording of backup moving image data. For example, when the backup moving image data 302 and main moving image data 301 are recorded as shown in FIG. 3, the first frames of first section 11, section 21, and section 31 are displayed.

When displaying the index screen of all sections, the control unit 106 instructs the recording medium control unit 108 to read out data corresponding to respective positions based on information about the recording start positions and recording stop positions of main moving image data stored in the memory 102.

The recording medium control unit 108 reads out moving image data of the designated portions, and sequentially sends them to the signal processing unit 103. The control unit 106 instructs the signal processing unit 103 to reduce frames corresponding to the recording start positions and recording stop positions of the main moving image data and generate thumbnail images. The signal processing unit 103 decodes the readout moving image data, and reduces the frames designated by the control unit 106, generating thumbnail image data. The signal processing unit 103 generates an index screen including the thumbnail image of the backup moving image data and the thumbnail images at the recording start positions and recording stop positions, and sends it to the display control unit 104. The display control unit 104 displays the generated index screen on the display unit 105.

Figure 4D:
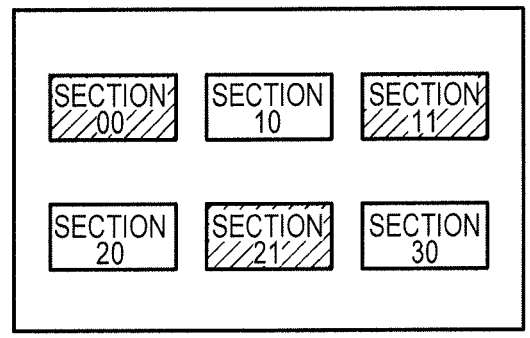

FIG. 4D exemplifies the index screen of all the sections of backup moving image data. The index screen in FIG. 4D will be called the fourth index screen. The fourth index screen displays the thumbnail images of frames corresponding to the recording start position of backup moving image data, and the recording start positions and recording stop positions of main moving image data. For example, when the backup moving image data 302 and main moving image data 301 are recorded as shown in FIG. 3, the first frames of respective sections are displayed. If the thumbnail images of all sections cannot be displayed on one screen, the user instructs a change of the page via the operation unit 107, and the index screen of the next section is displayed on the display unit 105.

In this fashion, when any one of representative images is selected and the start of reproduction is instructed while one of the first to fourth index screens is displayed, backup moving image data of the selected representative image is reproduced. For example, when the start of reproduction is instructed during display of the first index screen, the control unit 106 instructs each block to reproduce backup moving image data from the beginning. The recording medium control unit 108 starts readout from the beginning of stream data of the backup moving image file, and sequentially stores the data in the memory 102. The signal processing unit 103 reads out the moving image data from the memory 102, sequentially decodes them, and sends them to the display control unit 104. The display control unit 104 displays the decoded moving image data on the display unit 105. When the user instructs the stop of reproduction, the control unit 106 stops reproduction of the backup moving image data, and displays again the first index screen.

When the start of reproduction is instructed during display of the second index screen, the control unit 106 instructs each block to reproduce backup moving image data of a section corresponding to a selected representative image. For example, when the representative image of section 10 is selected in FIG. 4B, the control unit 106 detects the first and final frames of this section based on information about the recording start position and recording stop position of main moving image data stored in the memory 102. The control unit 106 instructs the recording medium control unit 108 to reproduce the moving image data from the first frame.

The recording medium control unit 108 reads out stream data of the backup moving image file from the designated frame, and stores them in the memory 102. The signal processing unit 103 reads out the moving image data from the memory 102, sequentially decodes them, and sends them to the display control unit 104. The display control unit 104 displays the decoded moving image data on the display unit 105. If the moving image data have been reproduced up to the final frame of this section or the stop of reproduction is instructed, the control unit 106 stops reproduction of the backup moving image data, and displays again the second index screen.

When the start of reproduction is instructed during display of the third index screen, the control unit 106 instructs each block to reproduce backup moving image data of a section corresponding to a selected representative image. For example, when the representative image of section 11 is selected in FIG. 4C, the control unit 106 detects the first and final frames of this section based on information about the recording start position and recording stop position of main moving image data stored in the memory 102. The control unit 106 instructs the recording medium control unit 108 to reproduce the moving image data from the first frame.

The recording medium control unit 108 reads out stream data of the backup moving image file from the designated frame, and stores them in the memory 102. The signal processing unit 103 reads out the moving image data from the memory 102, sequentially decodes them, and sends them to the display control unit 104. The display control unit 104 displays the decoded moving image data on the display unit 105. If the moving image data have been reproduced up to the final frame of this section or the stop of reproduction is instructed, the control unit 106 stops reproduction of the backup moving image data, and displays again the third index screen.

When the start of reproduction is instructed during display of the fourth index screen, the control unit 106 instructs each block to reproduce backup moving image data of a section corresponding to a selected representative image, as described above.

Also, when the user instructs display of the index of main moving image data during display of one of the first to fourth index screens, the index screen of main moving image data recorded during recording of backup moving image data is displayed.

When display of the index of main moving image data is instructed from the operation unit 107, the control unit 106 instructs the recording medium control unit 108 to read out identification information of main moving image data recorded during recording of currently displayed backup moving image data. In accordance with the instruction from the control unit 106, the recording medium control unit 108 reads out identification information of the main moving image data that has been stored as additional information of the backup moving image data, and stores it in the memory 102. Based on the identification information stored in the memory 102, the control unit 106 instructs the recording medium control unit 108 to detect the main moving image data recorded during recording of the backup moving image data, and read out thumbnail image data of the respective main moving image data. For example, when the main moving image data 301 are recorded as shown in FIG. 3, the recording medium control unit 108 reads out thumbnail image data of the main moving image files from the first recording medium 109 and stores them in the memory 102. The signal processing unit 103 generates an index screen including the thumbnail image data of the main moving image data that have been stored in the memory 102, and sends it to the display control unit 104. The display control unit 104 displays the generated index screen on the display unit 105.

Figure 4E:
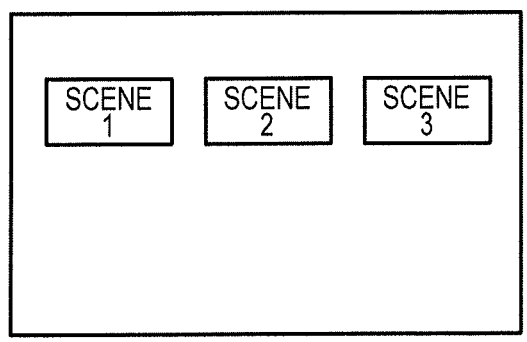

FIG. 4E exemplifies the index screen of main moving image data recorded during recording of backup moving image data. For example, when the backup moving image data 302 and main moving image data 301 are recorded as shown in FIG. 3, the first frames of scene 1 to scene 3 of the main moving image data are displayed.

For example, when the start of reproduction is instructed during display of the index screen in FIG. 4E, the control unit 106 instructs each block to reproduce main moving image data of a scene corresponding to a selected representative image from the beginning. The recording medium control unit 108 starts readout from the beginning of stream data of the selected main moving image file, and sequentially stores the data in the memory 102. The signal processing unit 103 reads out the moving image data from the memory 102, sequentially decodes them, and sends them to the display control unit 104. The display control unit 104 displays the decoded moving image data on the display unit 105. When the stop of reproduction is instructed, the control unit 106 stops reproduction of the main moving image data, and displays again the index screen in FIG. 4E.

<Copy Processing for Backup Moving Image Data> Next, copy processing for backup moving image data by the image capturing apparatus according to the embodiment will be explained.

In the embodiment, when moving image data of a section sectionalized by the recording start position and recording stop position of main moving image data is selected from backup moving image data, the moving image data of the selected section can be copied to a recording medium on which the main moving image data is recorded.

Figure 5:
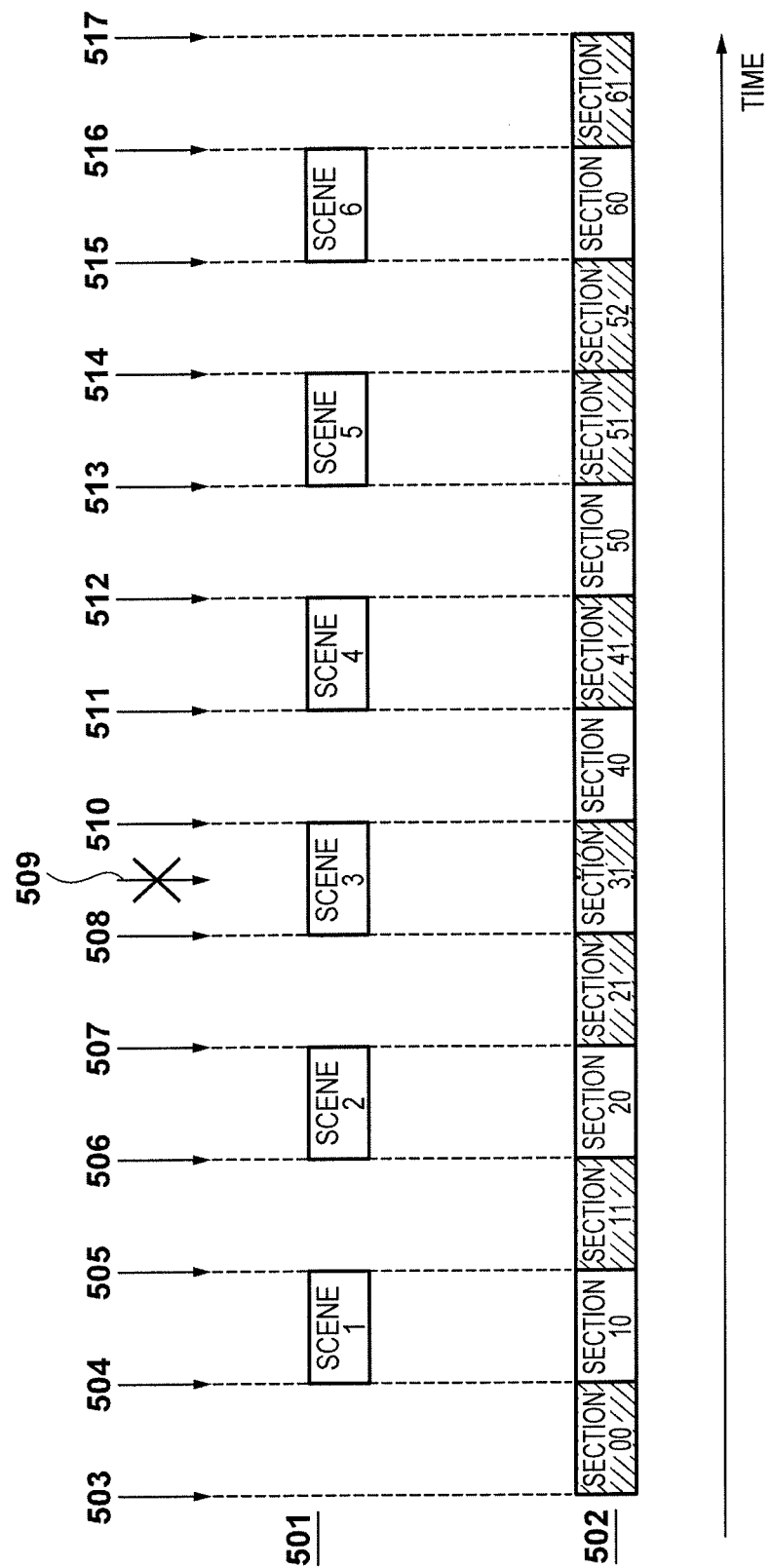
FIG. 5 is a view exemplifying moving image data recorded in the backup recording mode.

FIG. 5 exemplifies backup moving image data and main moving image data recorded in the backup recording mode.

In FIG. 5, recording of backup moving image data 502 continues until the stop of recording the backup moving image data 502 is instructed at time 517 after the start of recording the backup moving image data 502 is instructed at time 503. During recording of the backup moving image data 502, main moving image data 501 of scene 1 to scene 6 are recorded.

Assume that the user has intended to instruct the stop of recording main moving image data at time 509 during recording of moving image data of scene 3, but the user has actually operated the trigger button at time 510 without instructing the stop of recording. In this case, the user has intended to instruct the start of recording main moving image data at the time 510, but has instructed the apparatus to stop recording. After that, the user has intended to start recording at time 512, but the user has actually instructed the stop of recording.

During recording of main moving image data of scene 5, the user notices that the start and stop of recording are replaced, instructs the stop of recording the main moving image data of scene 5 at time 514, and then instructs the start of recording main moving image data of scene 6 at time 515.

In this manner, the user does not instruct the stop of recording scene 3, and does not notice that the start and stop of recording are replaced for scene 4 and scene 5. Scenes the user wanted to capture actually are section 40 and section 50 in backup moving image data.

In such a case, according to the embodiment, the user can only simply designate a section the user wants in the backup moving image data 502 to copy moving image data of the designated section to a recording medium on which main moving image data of other scenes are recorded.

Figure 6:
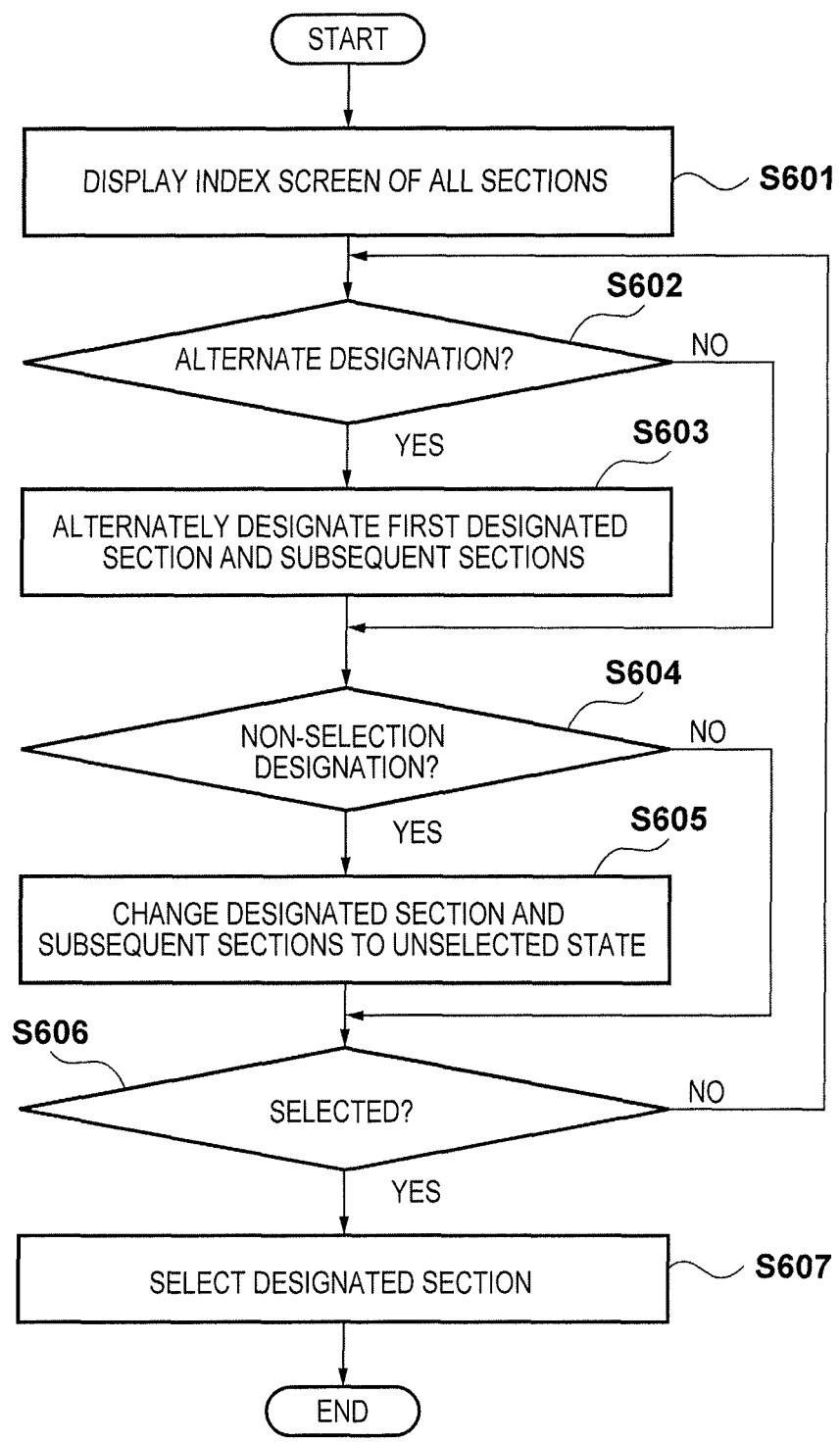
FIG. 6 is a flowchart showing copy target section selection processing.

FIG. 6 is a flowchart showing processing of selecting a copy target section of backup moving image data. Note that the processing in FIG. 6 is implemented by expanding a program stored in a ROM or the like in the work area of the memory 102 and executing it by the control unit 106.

In the above-described reproduction mode, when backup moving image data is recorded on either of the first recording medium 109 and second recording medium 110, the control unit 106 displays identification information such as the file name of backup moving image data on the display unit 105. When a plurality of backup moving image data are recorded, the user can select one of the plurality of displayed backup moving image data via the operation unit 107. The control unit 106 controls the recording medium control unit 108 to read out thumbnail image data and information about the recording start positions and recording stop positions of main moving image data from the selected backup moving image data, and store them in the memory 102.

When the user selects the index screen of all sections, the control unit 106 displays, on the display unit 105, the index screen of all sections of the backup moving image data based on the information about the recording start positions and recording stop positions of the main moving image data stored in the memory 102 (step S601).

Figure 7A:
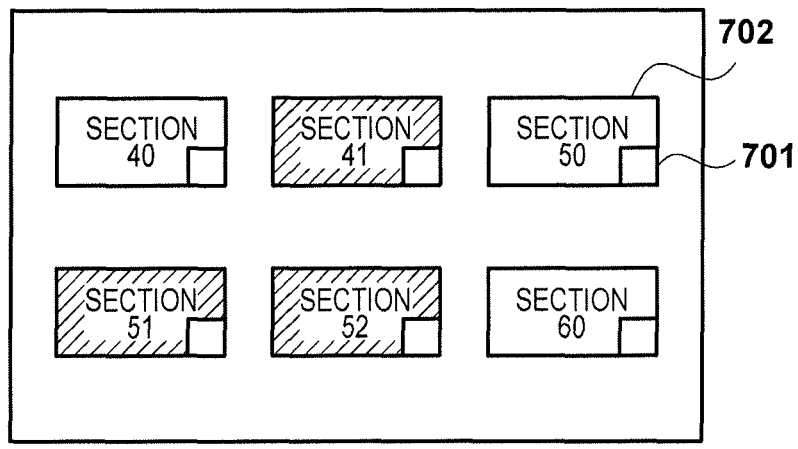
FIGS. 7A to 7C are views each exemplifying a copy target section selection screen.

FIG. 7A exemplifies the index screen of all sections of the backup moving image data 502 recorded as shown in FIG. 5. In the example shown in FIG. 7A, a display region 701 for identifying a designated section is displayed in addition to each representative image. The user operates the operation unit 107 to designate selection/non-selection of each displayed section. For example, a cursor 702 for selecting a representative image is displayed. The user can select a copy target section by checking the display region of a section the user wants while selecting a representative image by moving the cursor 702.

In addition to individually selecting a copy target section by the user, the embodiment provides all designation, alternate designation, and non-selection functions. For example, when the user operates the operation unit 107 to select all designation from a menu screen or the like during display of the index screen of all sections in FIG. 7A, the display regions 701 of all the sections are selected. When the user selects alternate designation, the start section selected at that time and every other subsequent section are alternately selected. When the user selects non-selection designation, the selected state of a section selected by the cursor 702 at that time and all subsequent sections is canceled and changed to the unselected state.

Referring back to FIG. 6, after displaying the index screen of all sections, the control unit 106 determines whether alternate designation has been selected (step S602). If alternate designation has been selected, the control unit 106 alternately selects the first section and subsequent sections selected at that time (step S603).

If the alternate designation has not been selected, the control unit 106 determines whether non-selection designation has been selected (step S604). If non-selection designation has been selected, the control unit 106 changes, to the unselected state, a section selected by the cursor 702 at that time and subsequent sections (step S605).

If non-selection designation has not been selected and a section has individually been selected by the operation unit 107 (YES in step S606), the control unit 106 sets the section designated at that time as a section selected as a copy target. Then, the control unit 106 determines the start and end positions of the section selected as the copy target based on the information about the recording start positions and recording stop positions of main moving image data stored in the memory 102, and stores them in the memory 102.

Figure 7B:
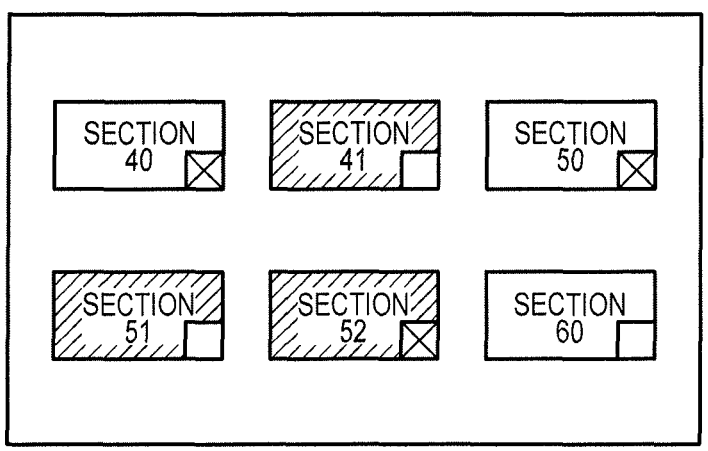
Figure 7C:
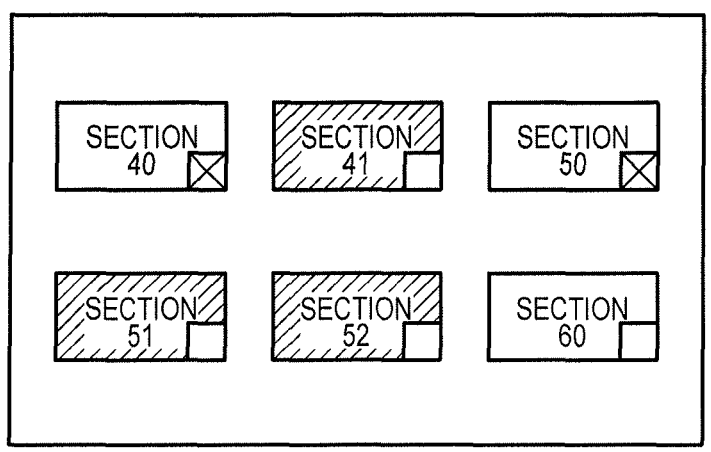

For example, in FIG. 7A, when the user selects section 40 as a copy target and then selects alternate designation, section 40, section 50, section 52, and section 61 in FIG. 5 are selected, and section 40, section 50, and section 52 are selected, as shown in FIG. 7B. Further, section 52 and subsequent sections are changed to the unselected state in the state of FIG. 7B. For this purpose, when the user moves the cursor 702 to the representative image of section 52 and selects non-selection designation, all section 52 and subsequent sections are changed to the unselected state, as shown in FIG. 7C.

When the user designates the start of copying while selecting a copy target section in the above-described manner, the control unit 106 copies data of the copy target section out of backup moving image data to a recording medium serving as the recording destination of main moving image data, based on information about the start and end positions of the copy target section. For example, when section 40 and section 50 are selected from the backup moving image data 502 in FIG. 5, the control unit 106 instructs the recording medium control unit 108 to copy moving image data of section 40 and section 50 to the first recording medium 109. In accordance with the instruction from the control unit 106, the recording medium control unit 108 reads out stream data of section 40 and section 50 from the second recording medium 110, and records them on the first recording medium 109. The recording medium control unit 108 then records the stream data of each section as a moving image file of each scene on the second recording medium 110.

As described above, according to the embodiment, while moving image data is recorded on one recording medium in the backup recording mode, main moving image data is recorded on the other recording medium in accordance with a recording start/stop instruction by the user. Even if the recording start/stop instruction for main moving image data on the other recording medium is inverted, a scene the user originally wanted to record can be recorded as backup moving image data.

In the embodiment, backup moving image data is reproduced for each section sectionalized by the recording start position and recording stop position of main moving image data stored in the backup recording mode. Hence, a scene the user actually wanted to record can be easily reproduced and confirmed.

In the embodiment, moving image data of a section selected by the user from sections each sectionalized by the recording start position and recording stop position of main moving image data can be copied as another scene. Therefore, a scene the user actually wanted to record can be easily extracted and recorded.

In the above-described embodiment, position information from the start of a frame for which the start/stop of recording main moving image data has been instructed in backup moving image data is used as information about the recording start position and recording stop position of main moving image data. However, the present invention is not limited to this and, for example, the time code may be used.

Also, backup moving image data is copied to a recording medium on which main moving image data is recorded. However, the present invention is not limited to this. For example, moving image data of a section selected by the user from backup moving image data may be set as a file different from the backup moving image data, and copied to a recording medium on which the backup moving image data is recorded.

Information about the recording start position and recording stop position of main moving image data is stored in a moving image file as additional information of backup moving image data. However, the present invention is not limited to this and, for example, information about the recording start position and recording stop position of main moving image data may be recorded as a file different from the file of the backup moving image data.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-032442, filed Feb. 21, 2013 which is hereby incorporated by reference herein in its entirety.

What is claimed is:

1. A recording apparatus, comprising:
an obtaining unit configured to obtain moving image data;
a recording unit configured to record first moving image data obtained by the obtaining unit on a first recording medium and record second moving image data obtained by the obtaining unit on a second recording medium; and
a control unit configured to control the recording unit to, in accordance with an instruction to start recording the second moving image data as the first moving image data is being recorded on the first recording medium, start recording of the second moving image data on the second recording medium, and in accordance with an instruction to stop recording the second moving image data as the first moving image data is being recorded on the first recording medium, stop recording of the second moving image data on the second recording medium,
wherein the control unit controls the recording unit to record, on the first recording medium, additional information including information about positions in the first moving image data that correspond to the instruction to start recording the second moving image data and the instruction to stop recording the second moving image data, which are received during recording the first moving image data.

2. The apparatus according to claim 1, wherein the control unit controls the recording unit to continuously record the first moving image data obtained by the obtaining unit on the first recording medium in from an instruction to start recording to an instruction to stop recording the first moving image data, which are received separately from the instruction to start recording and the instruction to stop recording the second moving image data.

3. The apparatus according to claim 1, further comprising a reproduction unit configured to reproduce moving image data from the first recording medium,
wherein the control unit controls to display, on a display unit based on the additional information, an index screen including representative images associated with positions corresponding to the instruction to start recording and the instruction to stop recording the second moving image data, which are received during recording the first moving image data, in the first moving image data recorded on the first recording medium, and
the control unit controls the reproduction unit to reproduce the first moving image data in a section corresponding to a representative image selected from the plurality of representative images displayed on the index screen.

4. The apparatus according to claim 3, wherein the control unit controls the recording unit and the reproduction unit to reproduce the first moving image data in the section corresponding to at least one representative image selected from the plurality of representative images displayed on the index screen, and record the moving image data corresponding to at least one representative image on the second recording medium.

5. The apparatus according to claim 4, further comprising a selection unit configured to select a function of individually changing the plurality of representative images displayed on the index screen to a selected state, a function of changing all the plurality of representative images displayed on the index screen to the selected state, a function of alternately changing every other representative image to the selected state, and a function of canceling the selected state.

6. The apparatus according to claim 1, further comprising an image capturing unit configured to capture moving image data,
   wherein the recording unit records moving image data captured by the image capturing unit.

7. The apparatus according to claim 1, further comprising a selection unit configured to select at least one section from a plurality of sections each sectionalized by a position corresponding to an instruction to start recording and a position corresponding to an instruction to stop recording the second moving image data, in the first moving image,
   wherein the control unit copies moving image data of the section selected by the selection unit from the first recording medium to the second recording medium based on the additional information.

8. The apparatus according to claim 1, further comprising a reproduction unit configured to reproduce moving image data from the first recording medium,
   wherein the control unit controls to display, on a display unit based on the additional information, an index screen including at least one of a representative image associated with a position in the first moving image data corresponding to the instruction to start recording the second moving image data, which are received during recording the first moving image data, and a representative image associated with a position in the first moving image data corresponding to the instruction to stop recording the second moving image data, which are received during recording the first moving image data, and
   the control unit controls the reproduction unit to reproduce the first moving image data in a section corresponding to a selected representative image when the representative image is selected on the index screen.

9. The apparatus according to claim 8, wherein the control unit controls the reproduction unit to start a reproduction of the first moving image data from a position corresponding to the instruction to start recording the second moving image data or the instruction to stop recording the second moving image data associated with the selected representative image when the representative image is selected on the index screen.

10. The apparatus according to claim 8, wherein the moving image data in the section corresponding to the selected representative image is a moving image data in from the position corresponding to the instruction to start recording the second moving image data or from the position corresponding to the instruction to stop recording the second moving image data associated with the selected representative image, in the first moving image data, to the position corresponding to the next instruction to start recording the second moving image data or to the position corresponding to the next instruction to stop recording the second moving image data.

11. The apparatus according to claim 1, further comprising a reproduction unit configured to reproduce moving image data from the first recording medium,
   wherein the control unit controls to display, on a display unit based on the additional information, an index screen including a representative image associated with a position in the first moving image data corresponding to the instruction to stop recording the second moving image data, which are received during recording the first moving image data, and
   the control unit controls the reproduction unit to start the reproduction of the first moving image data from the position corresponding to the instruction to stop recording the second moving image data associated with the selected representative image when the representative image is selected on the index screen.

12. The apparatus according to claim 11, wherein the control unit controls the reproduction unit to start the reproduction of the first moving image data to a position corresponding to the next instruction to start recording the second moving image data after the instruction to stop recording the second moving image data associated with the selected representative image when the representative image is selected on the index screen.

13. The apparatus according to claim 1, wherein the first moving image data is recorded as a backup of the second moving image data.

14. The apparatus according to claim 1, the first and second moving image data is moving image data having the same number of pixels and the same frame rate.

15. A control method of a recording apparatus which includes an obtaining unit configured to obtain moving image data, and records first moving image data obtained by the obtaining unit on a first recording medium and record second moving image data obtained by the obtaining unit on a second recording medium, the method comprising:
   controlling to, in accordance with an instruction to start recording the second moving image data as the first moving image data is being recorded on the first recording medium, start recording of the second moving image data on the second recording medium, and in accordance with an instruction to stop recording the second moving image data as the first moving image data is being recorded on the first recording medium, stop recording of the second moving image data on the second recording medium, and
   record, on the first recording medium, additional information including information about positions in the first moving image data that correspond to the instruction to start recording the second moving image data and the instruction to stop recording the second moving image data, which are received during recording the first moving image data is recorded on the first recording medium.

* * * * *